United States Patent
Oroskar et al.

(10) Patent No.: US 8,989,152 B1
(45) Date of Patent: Mar. 24, 2015

(54) SYSTEMS AND METHODS FOR SYMMETRICAL IMPLEMENTATION OF INTER-CELL INTERFERENCE COORDINATION (ICIC) IN A RADIO ACCESS NETWORK (RAN)

(71) Applicant: Sprint Spectrum L.P., Overland Park, KS (US)

(72) Inventors: Siddarth S. Oroskar, Overland Park, KS (US); Jasinder P. Singh, Olathe, KS (US); Maulik K. Shah, Overland Park, KS (US); John W. Prock, Raymore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 157 days.

(21) Appl. No.: 13/765,336

(22) Filed: Feb. 12, 2013

(51) Int. Cl.
*H04W 4/00* (2009.01)
*H04W 36/30* (2009.01)
*H04W 72/12* (2009.01)

(52) U.S. Cl.
CPC .......... *H04W 36/30* (2013.01); *H04W 72/1226* (2013.01)
USPC ............................ 370/332; 370/329; 370/338

(58) Field of Classification Search
None
See application file for complete search history.

(56) References Cited

U.S. PATENT DOCUMENTS

| | | | |
|---|---|---|---|
| 5,276,907 A | 1/1994 | Meidan | |
| 6,493,331 B1 | 12/2002 | Walton et al. | |
| 6,757,522 B1* | 6/2004 | Naegeli et al. | 455/67.11 |
| 7,099,384 B1 | 8/2006 | Jalali et al. | |
| 2006/0083161 A1 | 4/2006 | Laroia et al. | |
| 2008/0014979 A1* | 1/2008 | Gorokhov et al. | 455/522 |
| 2009/0109939 A1* | 4/2009 | Bhushan et al. | 370/337 |
| 2009/0124261 A1 | 5/2009 | Shimomura | |
| 2009/0131065 A1* | 5/2009 | Khandekar et al. | 455/452.1 |
| 2009/0233554 A1 | 9/2009 | Cordeiro et al. | |
| 2010/0162069 A1* | 6/2010 | Niu et al. | 714/748 |
| 2010/0173637 A1* | 7/2010 | Damnjanovic et al. | 455/447 |
| 2010/0317363 A1* | 12/2010 | Bai et al. | 455/452.2 |
| 2011/0045856 A1* | 2/2011 | Feng et al. | 455/501 |
| 2011/0151912 A1* | 6/2011 | Taira et al. | 455/509 |
| 2011/0230224 A1* | 9/2011 | Larsson et al. | 455/513 |
| 2012/0115521 A1* | 5/2012 | Tong et al. | 455/501 |
| 2013/0172003 A1* | 7/2013 | Chun et al. | 455/452.1 |
| 2014/0024388 A1* | 1/2014 | Earnshaw et al. | 455/452.2 |

* cited by examiner

*Primary Examiner* — Bunjob Jaroenchonwanit (57) ABSTRACT

Disclosed herein are systems and methods for symmetrical implementation of inter-cell interference coordination (ICIC) in a radio access network (RAN) having a first base station serving a first set of access terminals and a second base station serving a second set of access terminals. In an embodiment, a network entity makes both a first determination that each access terminal in the first set is receiving at least a threshold-strong signal from the second base station and a second determination that each access terminal in the second set is receiving at least a threshold-strong signal from the first base station. Responsive to making these determinations in combination, the network entity manages an assignment of reverse-link resource blocks in the RAN such that no reverse-link resource blocks are assigned to both an access terminal in the first set and an access terminal in the second set.

18 Claims, 10 Drawing Sheets

SYSTEMS AND METHODS FOR SYMMETRICAL IMPLEMENTATION OF INTER-CELL INTERFERENCE COORDINATION (ICIC) IN A RADIO ACCESS NETWORK (RAN)

BACKGROUND

It is increasingly common for people to use client-side devices to communicate via a radio access network (RAN) with other devices, whether those devices are directly connected to the same RAN or to another network (such as another RAN or a transport network, as examples) to which that RAN directly or indirectly provides access. These client-side devices are generally referred to in this disclosure as access terminals, though this term is intended to broadly encompass various devices known by terms such as mobile stations, mobile devices, user equipment, wireless-communication devices, cellphones, smartphones, personal digital assistants (PDAs), tablets, laptops, air cards, Universal Serial Bus (USB) devices (e.g., dongles), and/or any other device(s) capable of functioning as an access terminal according to this disclosure. Via the RAN, access terminals generally engage in communications such as voice calls, packet-data sessions, text messaging (e.g., Short Message Service (SMS) messaging), and the like.

Furthermore, the wireless communication between the RAN and an access terminal is typically bidirectional in nature. The component of that communication that is sent from the RAN to the access terminal is described as being sent on what is known as the forward link, while the component that is sent from the access terminal to the RAN is described as being sent on what is known as the reverse link. On both links, the wireless communications are typically formatted in accordance with a wireless-communication protocol, one example type of which is code division multiple access (CDMA), where CDMA networks that operate according to industry specifications (IS) such as IS-95 and IS-2000 are often referred to as 1xRTT (or "1x") networks, where 1xRTT stands for Single Carrier Radio Transmission Technology.

Some RANs operate in accordance with a particular type of CDMA protocol known as Evolution Data Optimized (EV-DO). These RANs are generally configured to operate according to one or more versions of IS-856, and are designed to provide high-rate packet-data service to access terminals using a technique on the forward link known as time-division multiplexing (TDM) and using what is essentially 1x technology on the reverse link. More generally, RANs can be arranged to operate according to any of numerous other protocols, some examples of which are Long Term Evolution (LTE), Universal Mobile Telecommunications System (UMTS), WiMAX (IEEE 802.16), time division multiple access (TDMA), Global System for Mobile Communications (GSM), Wi-Fi (IEEE 802.11), and the like.

In RANs that are of a type known as wireless wide area networks (WWANs) (or cellular wireless networks), the entities with which access terminals communicate over the air interface are known by terms such as base station and access node, terms that are used at different times in different ways to refer to different entities. For example, the term base station is sometimes used to refer simply to a device also known as a base transceiver station (BTS), which contains the hardware, antennas, and other components that cooperate to actually conduct the over-the-air (OTA) communication with the access terminals on behalf of the RAN. In LTE networks, a BTS is typically referred to as an eNodeB, which stands for Evolved Node B, named as being an evolved version of a Node B in a UMTS Terrestrial RAN (or UTRAN). At times, however, the term base station or access node is used to refer in combination to (i) one or more BTSs and (ii) a device known as a base station controller (BSC) (or radio network controller (RNC)), which controls the BTS(s) and connects it (them) to the rest of the network and beyond.

Typically, the various base stations in a RAN are deployed in various locations in many different cities and other areas, with the aim of effectively blanketing such geographical areas with sufficient wireless coverage. As such, multiple wireless coverage areas (e.g., cells, sectors, and the like) in which a RAN provides wireless service are quite often adjacent to one another.

OVERVIEW

In some RANs, the wireless-communication protocol that is used is of a type known as orthogonal frequency division multiplexing (OFDM). By way of example and not limitation, the present systems and methods are described with reference to OFDM communications. It should be understood, however, that in connection with one or more embodiments, one or more other protocols (or types or families of protocols) may be used instead or in addition, including any mentioned herein, any suitable others, and any that may later be developed.

In a typical OFDM network (i.e., an OFDM RAN), a given base station provides wireless service to access terminals on one or more frequency bands in each of one or more coverage areas. Each such frequency band is typically divided into contiguous blocks of frequencies referred to as channels, each channel defined by a respective center (i.e., carrier) frequency. Within each channel, multiple discrete frequencies are designated as being what are referred to in OFDM networks as subcarriers. In OFDM networks that are of a type known as orthogonal frequency division multiple access (OFDMA) networks, the RAN (e.g., a base station) is able to assign designated contiguous blocks (i.e., groupings) of subcarriers within a given channel to different access terminals at different times (i.e., during one or more designated timeslots) for user-traffic communication. In the parlance of OFDMA networks, of which LTE networks are one type, a given subcarrier grouping during a given timeslot is referred to as a resource block. Moreover, the resource blocks on the forward and reverse links are independently assignable.

In some instances, it can occur that an access terminal that is operating in the coverage area of one base station and another access terminal that is in the coverage area of a nearby (e.g., adjacent) base station can interfere with each other at least with respect to their reverse-link transmissions to their respective base stations. The likelihood of such interference occurring is higher if both access terminals are assigned one or more of the same reverse-link resource blocks (i.e., the same subcarrier grouping(s) of the same channel at the same time (i.e., during the same timeslot(s)). This type of interference is often referred to as inter-cell interference (ICI), and a collection of approaches and strategies for mitigating and/or eliminating such interference is often referred to as inter-cell interference coordination (or sometimes cancellation) (ICIC). One approach of ICIC is to avoid, if possible, one or more of the same resource blocks being assigned to multiple potentially interfering access terminals in different yet proximal coverage areas.

Figure 5A:
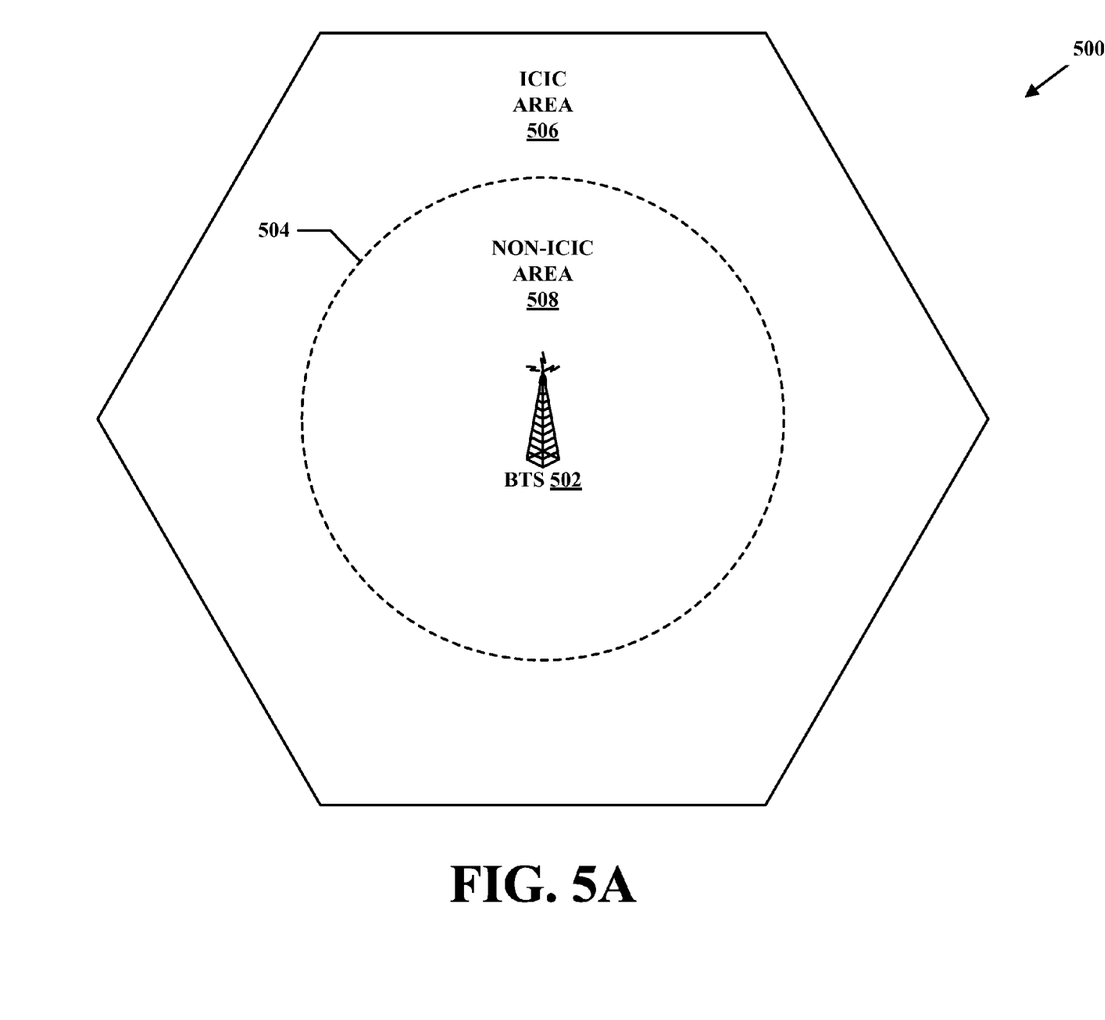
FIG. 5A depicts an example wireless coverage area.
Figure 5B:
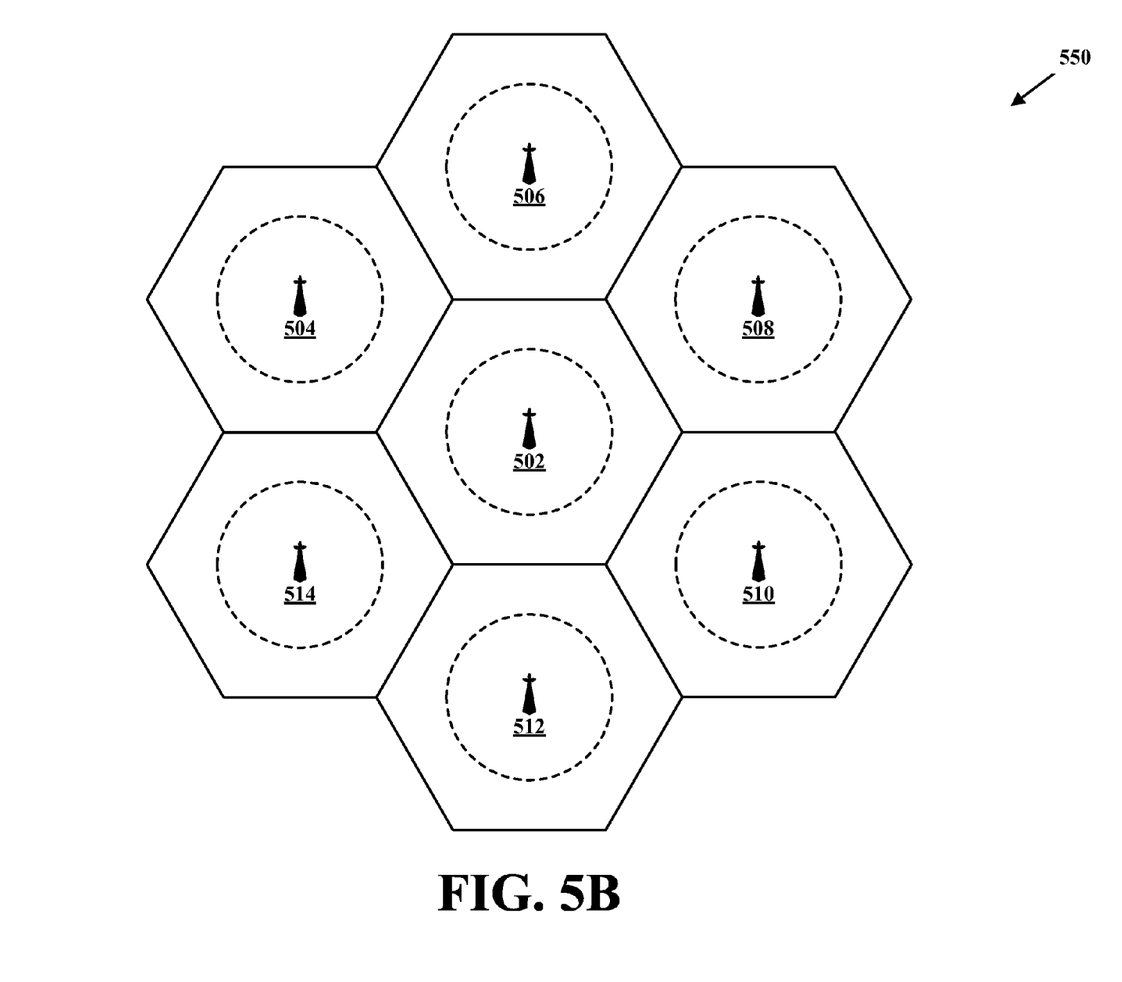
FIG. 5B depicts an example group of adjacent wireless coverage areas.

An additional aspect of ICIC can be illustrated with reference by way of example to an OFDM RAN in which the various base stations each provide service in a substantially circular cell (which are often idealized, as they are in FIGS.

5A and 5B, as a hexagon for network-mapping purposes). In each cell, there is generally an area (or radius) of variable size, closest to the base station, within which the implementation of ICIC is considered unnecessary and is not carried out. That is, for access terminals that are close enough to their serving base stations so as to not present a threat of interference on the reverse link to other access terminals, all resource blocks are available for assignment from the respective base stations to the respective access terminals, which are often referred to as being in the non-ICIC area of that particular cell.

As access terminals stray further from their respective base stations while still remaining in their particular cells, it is quite often necessary as is known in the art for such access terminals to increase their transmission power on the reverse link, perhaps as requested by the base station, in order to maintain an acceptable level of quality of communication and/or user experience. The outlying remainder of the cell (i.e., the area within the cell but outside of the non-ICIC area) is often referred to as being the ICIC area of the cell. Examples of cells having respective non-ICIC areas and ICIC areas are depicted in FIGS. 5A and 5B.

The ICIC area of a cell (or the respective ICIC areas of multiple cells) can be defined—and equivalently an access terminal can be considered to be in the ICIC area of its serving cell—using one or more of any number of criteria, such as (i) location (i.e., geographically), (ii) time delay for communication between base station and access terminal, (iii) reverse-link transmission power being above a certain threshold, (iv) as-received forward-link transmission power of a signal from the serving base station being below a certain threshold, (v) as-received forward-link transmission power of a signal from an adjacent (i.e., non-serving) base station being above a certain threshold, and/or one or more other suitable criteria.

As such, the non-ICIC area and the ICIC area of a given cell can be thought of and characterized as areas in which, at the time, the respective access terminals that are considered to be in each area are those that meet one or more particular (but different and generally opposing) criteria, and are not necessarily fixed geographic regions within a particular cell. One reliable characteristic, however, is that the non-ICIC area will naturally be more central to the cell while the ICIC area will naturally be more towards the perimeter (i.e., border) of the cell. In some cases, based on cell size and/or one or more other factors, a given cell may not have much if any of a non-ICIC area, and certainly other examples and cases will arise.

In general, ICIC enhances a network's ability to support frequency reuse in neighboring cells. Current implementations, however, are over-inclusive and thus unnecessarily wasteful, as can be appreciated by considering a simple example involving only two base stations: a first base station serving access terminals in a first coverage area and a second base station serving (other) access terminals in an adjacent second coverage area. In current networks, if the first base station determines that a first access terminal (that the first base station is serving) is operating in the ICIC area of the first coverage area, the first base station responsively transmits a message to the second base station. (In operation, the first access terminal may identify (for the first base station) the second base station as being the neighboring base station from which the first access terminal is detecting a signal of at least threshold strength, though of course in this example there is only one base station other than the first base station.)

The first base station may transmit such a message wirelessly over what is known as the X2 interface to the second base station, and the message may be a high-interference indication (HII), informing the second base station as to which one or more resource blocks the first base station has assigned (or will be assigning) to the first access terminal. In this example, only reverse-link resource blocks are discussed, though this is not to the exclusion of also or instead considering forward-link resource blocks. After receiving the HII, the second base station complies with ICIC by not assigning any of those same resource blocks to any access terminals that are then operating in the ICIC area of the second coverage area. This has the intended result of reducing the potential for interference between the reverse-link communications of the first access terminal and any access terminals operating in the ICIC area of the second coverage area.

This is over-inclusive and unnecessarily wasteful, however, since one or more (and perhaps all) of the access terminals that are operating in the ICIC area of the second coverage area may be so far away from the first base station (perhaps situated on the side of the second coverage area that is substantially opposite the first base station) so as to present no significant threat of interference. And although they are likely transmitting with more power on the reverse link than are their second-coverage-area non-ICIC-area counterparts, such second-coverage-area ICIC-area access terminals would actually be further away from the first base station.

The end result—that all of the access terminals in the ICIC area of the second coverage area have unavailable to them the one or more resource blocks assigned by the first base station to the first access terminal—is an unnecessary and therefore potentially inefficient limitation being placed on the limited air-interface resources of the second base station. And increasing the number of ICIC-area access terminals in the first coverage area only exacerbates the problem, as does the presence of ICIC-area access terminals in the second coverage area with respect to the limited air-interface resources of the first base station.

To address these and other concerns about and drawbacks of prior implementations, presently disclosed are systems and methods for symmetrical implementation of ICIC in a RAN. One embodiment takes the form of a method carried out by at least one network entity in the context of a communication system that includes a RAN providing wireless service to access terminals. The RAN includes a first base station providing the wireless service to a first set of one or more access terminals, and also includes a second base station providing the wireless service to a second set of one or more access terminals.

In accordance with the embodiment, the method includes making a first determination that each access terminal in the first set is receiving at least a threshold-strong signal from the second base station, and further includes making a second determination that each access terminal in the second set is receiving at least a threshold-strong signal from the first base station. The method further includes, responsive to making the first and second determinations in combination, managing an assignment of reverse-link resource blocks in the RAN such that no reverse-link resource blocks are assigned to both an access terminal in the first set and an access terminal in the second set.

Another embodiment takes the form of at least one network entity that includes a communication interface, a processor, and data storage containing program instructions executable by the processor for carrying out the just-described method. The present systems and methods more effectively and efficiently utilize the limited air-interface resources (e.g., resource blocks) of the RAN, and avoid the inefficient wastefulness that accompanies the manner in which current implementations overuse ICIC and accordingly unnecessarily restrict the availability of such resources. These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, in which like numerals denote like entities, and in which.

DETAILED DESCRIPTION OF THE DRAWINGS

I. Introduction

The present systems and methods will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out of one or more of the functions described herein.

II. Example Architecture

A. Example Communication System

Figure 1:
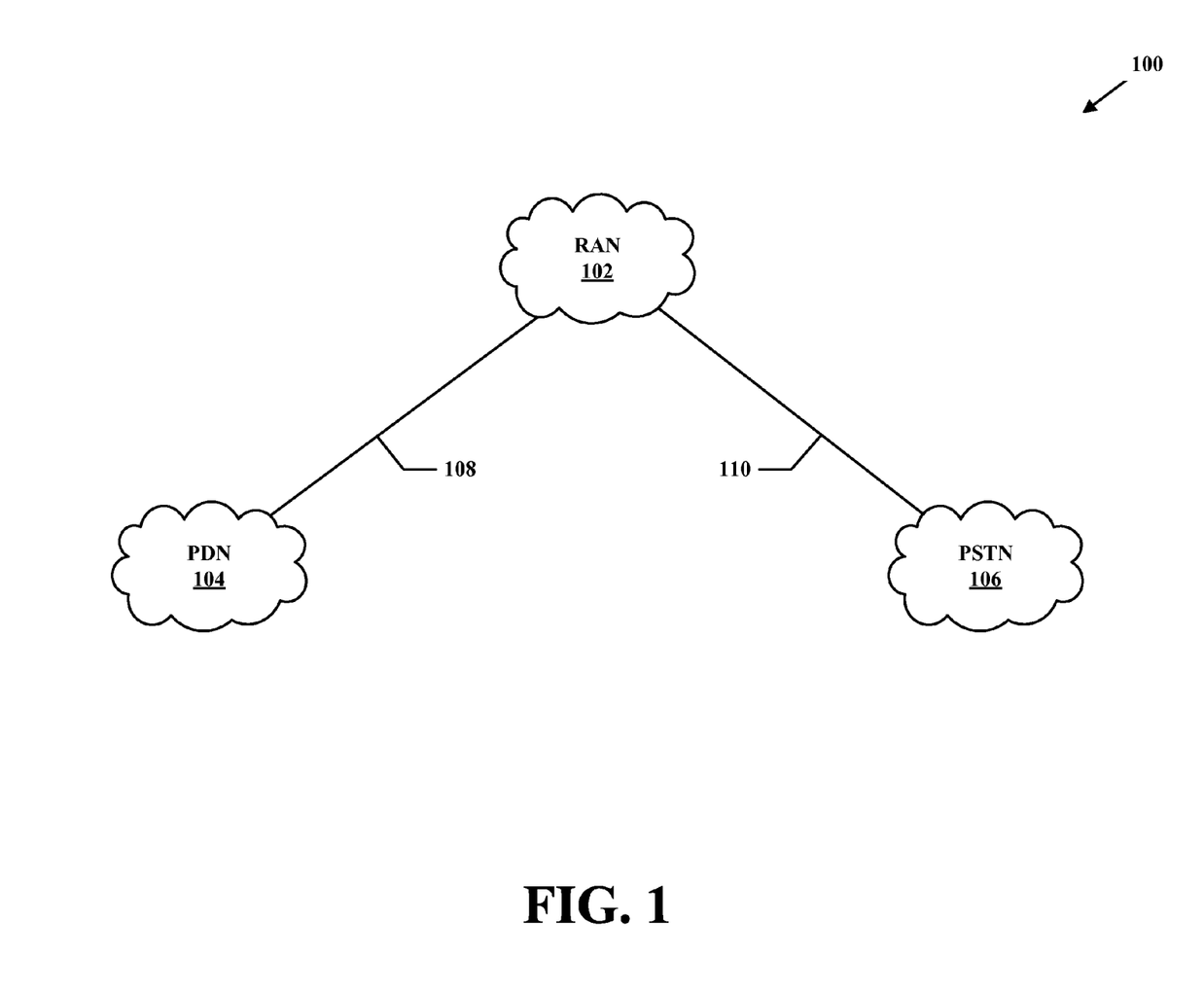
FIG. 1 depicts an example communication system.

Referring to the drawings, FIG. 1 depicts a communication system 100 that includes a RAN 102, a packet-data network (PDN) 104, and a public switched telephone network (PSTN) 106. RAN 102 communicates with PDN 104 via a communication link 108, and with PSTN 106 via a communication link 110; either or both of these communications links may include one or more wired and/or wireless interfaces.

B. Example Radio Access Network (RAN)

Figure 2:
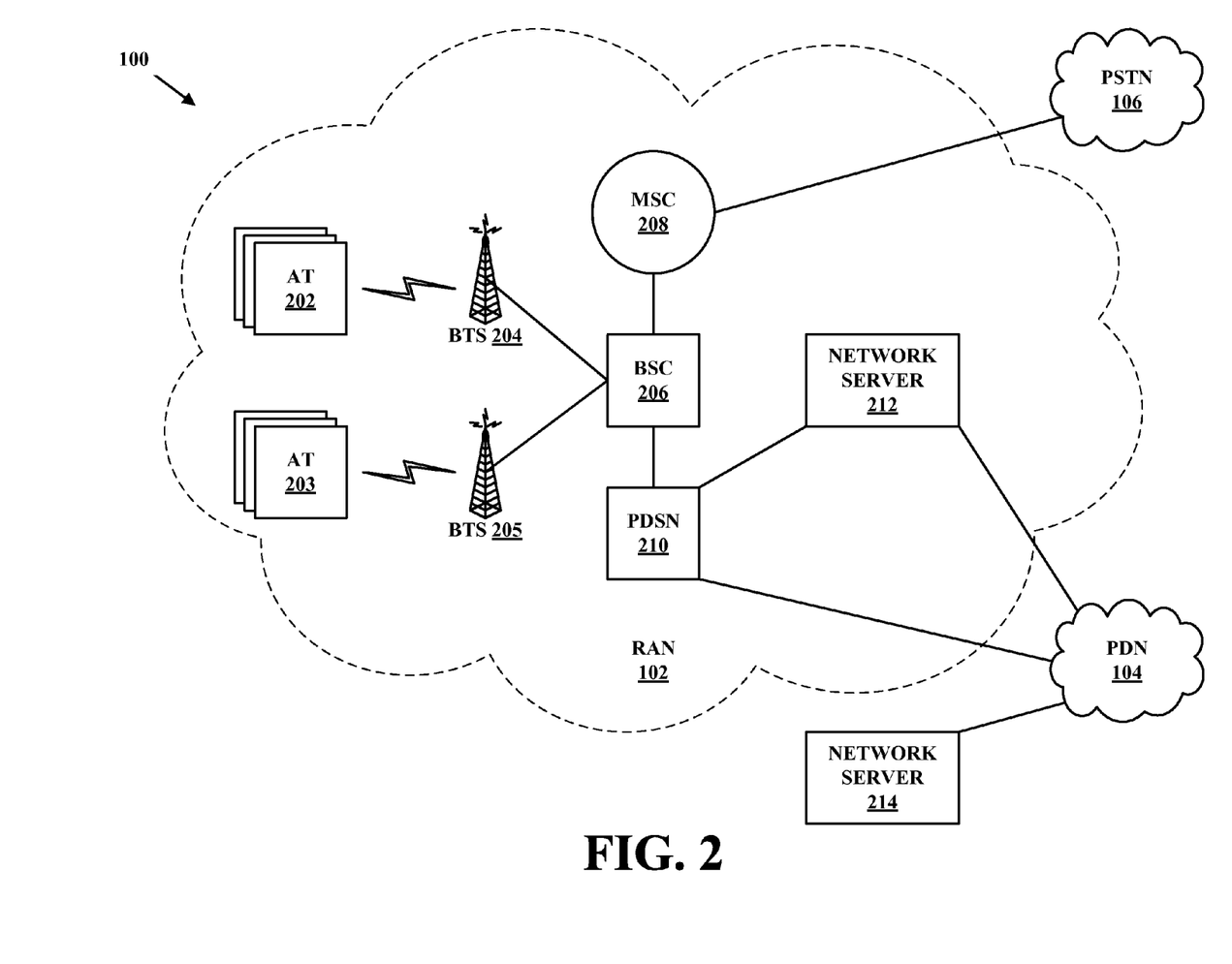
FIG. 2 depicts an example radio access network (RAN) in the context of the example communication system of FIG. 1.

FIG. 2 depicts communication system 100 with a more detailed depiction of RAN 102, which is shown in this example as including a plurality of access terminals 202 being served by a BTS 204, a second plurality of access terminals 203 being served by a second BTS 205, a BSC 206, a mobile switching center (MSC) 208, a packet data serving node (PDSN) 210, and network servers 212 and 214. Additional entities could also be present, and there could be one or more routers, switches, and/or other devices or networks making up at least part of one or more of the communication links. And other variations are possible as well.

An example access terminal is described below in connection with FIG. 3, while an example network entity is described below in connection with FIG. 4. The example access terminal could represent any one or more of the access terminals 202 and 203, while the example network entity could represent any one or any combination of BTS 204, BTS 205, BSC 206, MSC 208, PDSN 210, network server 212, network server 214, one or more other network servers, and/or one or more other devices and/or entities of any other type that are suitably arranged, programmed, and configured to—alone and/or in various combinations—carry out the functions described herein as being carried out by at least one network entity.

Each of BTS 204 and BTS 205 generally functions to provide wireless service to access terminals in their respective coverage areas, as described herein, and to bridge air-interface communications with access terminals on the one hand and backhaul communications with BSC 206 on the other hand. BSC 206 generally functions to control one or more BTSs, and to provide one or more BTSs with connections to devices such as MSC 208 and PDSN 210.

MSC 208 generally functions to connect BSCs to circuit-switched networks such as PSTN 106, and serves at least a telephone-switch function to facilitate such connections. PDSN 210 generally functions to connect BSCs to devices such as network server 212 and to packet-switched networks such as PDN 104, which could be the Internet; as such, PDSN 210 serves at least a network-access-server (NAS) function to facilitate such connections. One or both of network server 212 and network server 214 may, among other operations, carry out one or more of the functions described herein as being carried out by at least one network entity.

C. Example Access Terminal

Figure 3:
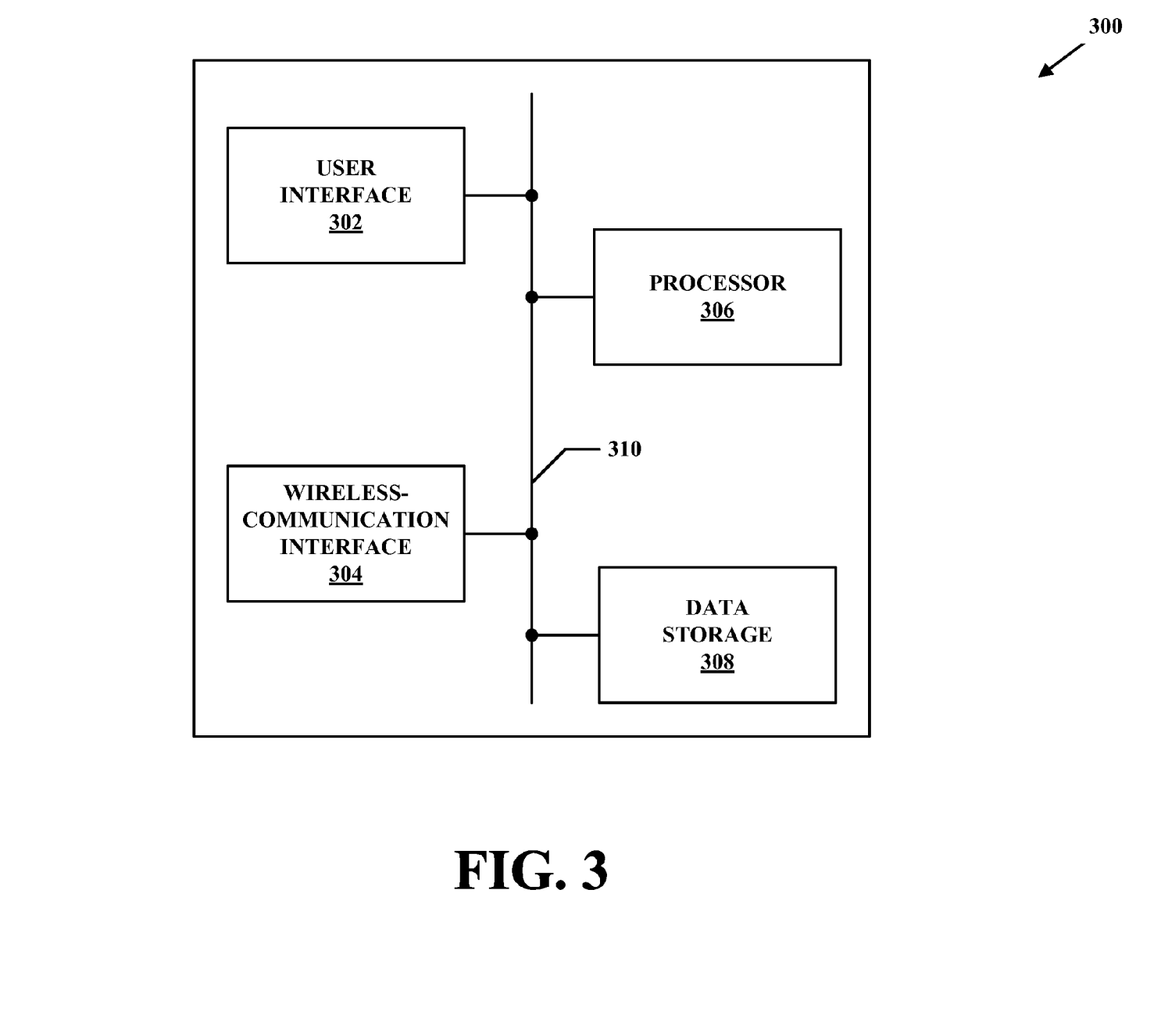
FIG. 3 depicts an example access terminal.

FIG. 3 depicts an example access terminal 300 as including a user interface 302, a wireless-communication interface 304, a processor 306, and data storage 308, all of which may be coupled together by a system bus, network, or other communication mechanism 310.

User interface 302 may include one or more input devices such as a touchscreen, one or more buttons, a microphone, and the like for receiving inputs from users, as well as one or more output devices such as a display, one or more indicator lights, a speaker, and the like for communicating outputs to users. Wireless-communication interface 304 may comprise one or more antennae and one or more chipsets for communicating with one or more base stations over respective air interfaces. As an example, one such chipset could be suited for OFDMA (e.g., LTE) communication. As another example, one such chipset could be suited for CDMA (e.g., EV-DO) communication. The wireless-communication interface may also or instead be arranged to communicate according to one or more other types of wireless communication (e.g., protocols) mentioned herein and/or any others now known or later developed.

Processor 306 may comprise one or more general-purpose processors and/or one or more special-purpose processors, and may be integrated in whole or in part with wireless-communication interface 304. Data storage 308 may comprise one or more volatile and/or non-volatile storage components (such as magnetic, optical, flash, or other non-transitory storage), and may be integrated in whole or in part with processor 306. And certainly other configurations are possible. Data storage 308 may contain program instructions executable by processor 306 for carrying out various access-terminal functions described herein.

D. Example Network Entity

Figure 4:
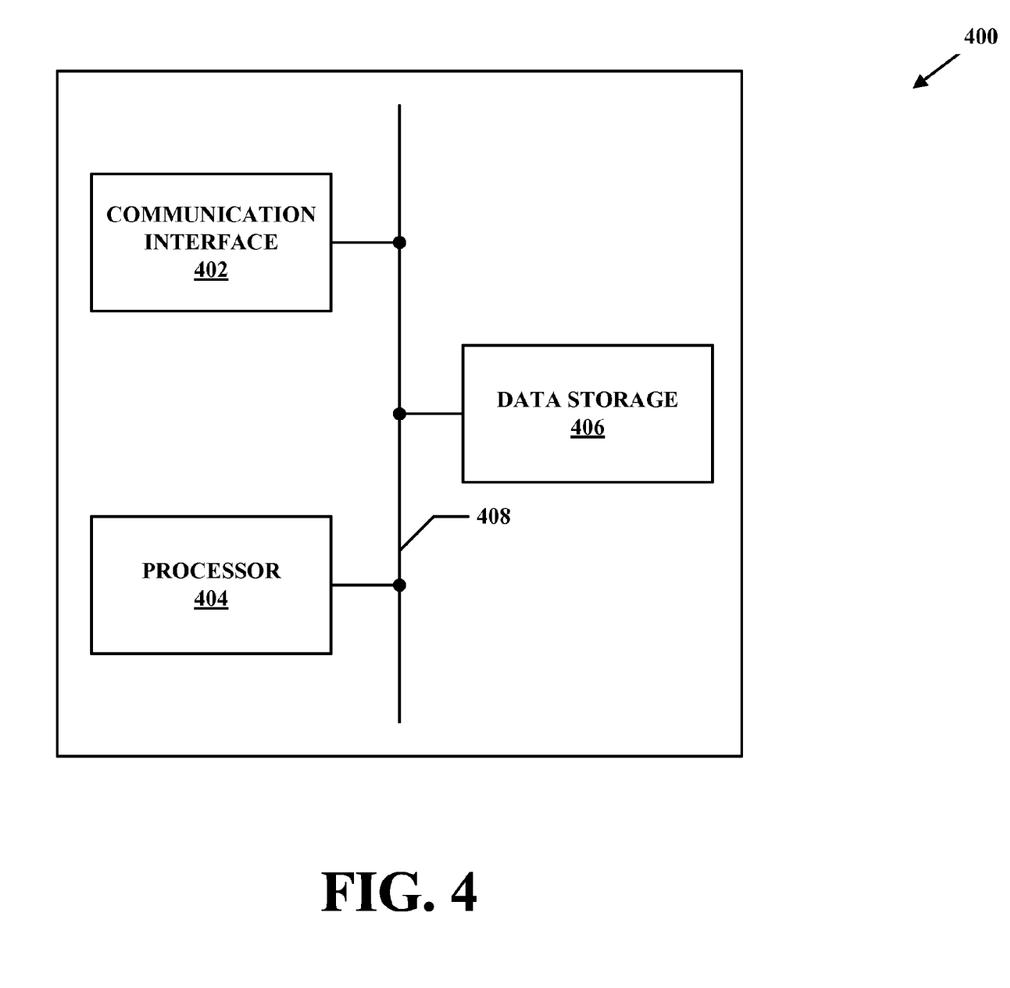
FIG. 4 depicts an example network entity.

FIG. 4 depicts an example network entity 400 as including a communication interface 402, a processor 404, and data storage 406, all of which may be coupled together by a system bus, network, or other communication mechanism 408. Communication interface 402 may include one or more interfaces (e.g., Ethernet) for engaging in wired communication and/or one or more interfaces (e.g., LTE, Wi-Fi) for engaging in wireless communication.

Processor 404 may comprise one or more general-purpose processors and/or one or more special-purpose processors, and may be integrated in whole or in part with communication interface 402. Data storage 406 may comprise one or more volatile and/or non-volatile storage components (such as magnetic, optical, flash, or other non-transitory storage), and may be integrated in whole or in part with processor 404. And certainly other configurations are possible. Data storage 406 may contain program instructions executable by processor 404 for carrying out various network-entity functions described herein. Network entity 400 may also have a user interface and/or one or more other components deemed suitable for various contexts.

E. Example Network Layout

1. Example Cell

FIG. 5A depicts an example wireless coverage area. In particular, FIG. 5A depicts an example cell 500 in which service is provided by an example BTS 502, which may function and have a structure and arrangement similar to that of BTS 204 and BTS 205. Cell 500 includes an ICIC area 506 and a non-ICIC area 508, depicted for conceptual and illustrative purposes as being demarcated by a dashed line 504.

2. Example Group of Adjacent Cells

FIG. 5B depicts an example group of adjacent wireless coverage areas. In particular, FIG. 5B depicts seven adjacent cells: cell 500 (occupied by BTS 502) from FIG. 5A surrounded by six adjacent cells respectively occupied by base stations marked as BTS 504-514. In each depicted cell, FIG. 5A, a dashed circle conceptually and illustratively demarcates the cell's respective (outer) ICIC area from its (inner) non-ICIC area.

F. Example Air-Interface Structure

As discussed above, within the context of a given frequency band, a given OFDM (e.g., LTE) RAN typically implements certain organizational structures on the air interface, in order to facilitate assigning network resources to access terminals for user-traffic communication. As respectively described below in connection with FIGS. 6A, 6B, and 6C, three such structures are known as resource maps, resource grids, and resource blocks.

1. Example Resource Map

Figure 6A:
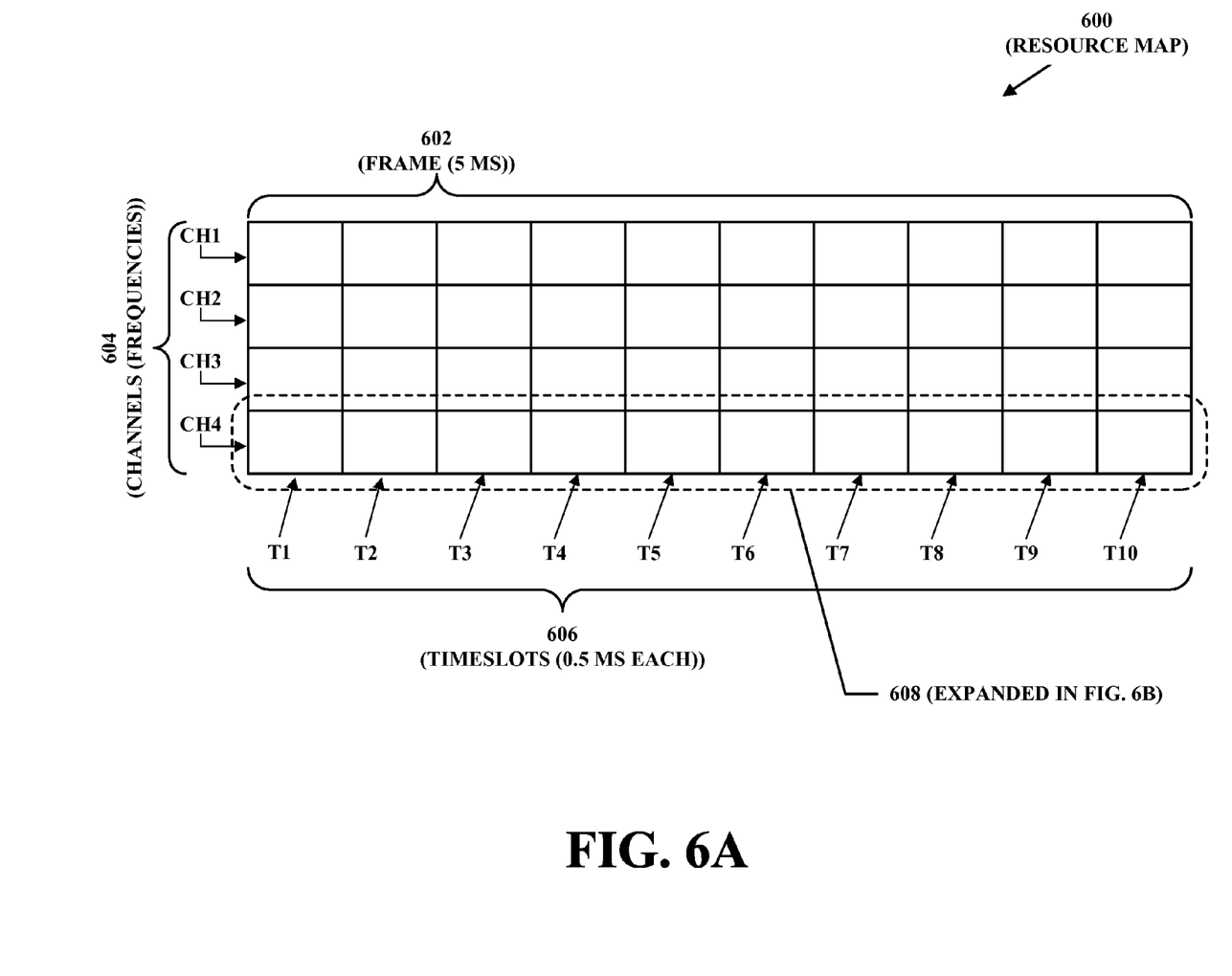
FIG. 6A depicts an example resource map corresponding with a wireless coverage area.

FIG. 6A depicts an example resource map corresponding with a wireless coverage area. As described above, each channel in a frequency band typically includes a contiguous block of frequencies, with no overlap among the frequencies making up the various channels. A resource map is a two-dimensional conceptual representation of a logical mapping of the channels (within a given frequency band) against timeslots (usually within one example transmission frame). As such, each cell in a resource map represents one channel during one timeslot.

In FIG. 6A, the resource map 600 maps four example channels 604 (labeled CH1-CH4) against the (example) ten timeslots 606 (labeled T1-T10) into which the depicted example frame 602 is divided. The example duration of frame 602 is 5 milliseconds (ms), and the duration of each of the ten equal-duration timeslots 606 is 0.5 ms, as shown. Thus, each cell in FIG. 6A represents one of the (example) four available channels in the example frequency band during one of the (example) ten available timeslots in frame 602. As shown at 608, the row corresponding to CH4 in all ten timeslots (T1-T10) is expanded in FIG. 6B.

2. Example Resource Grid

Figure 6B:
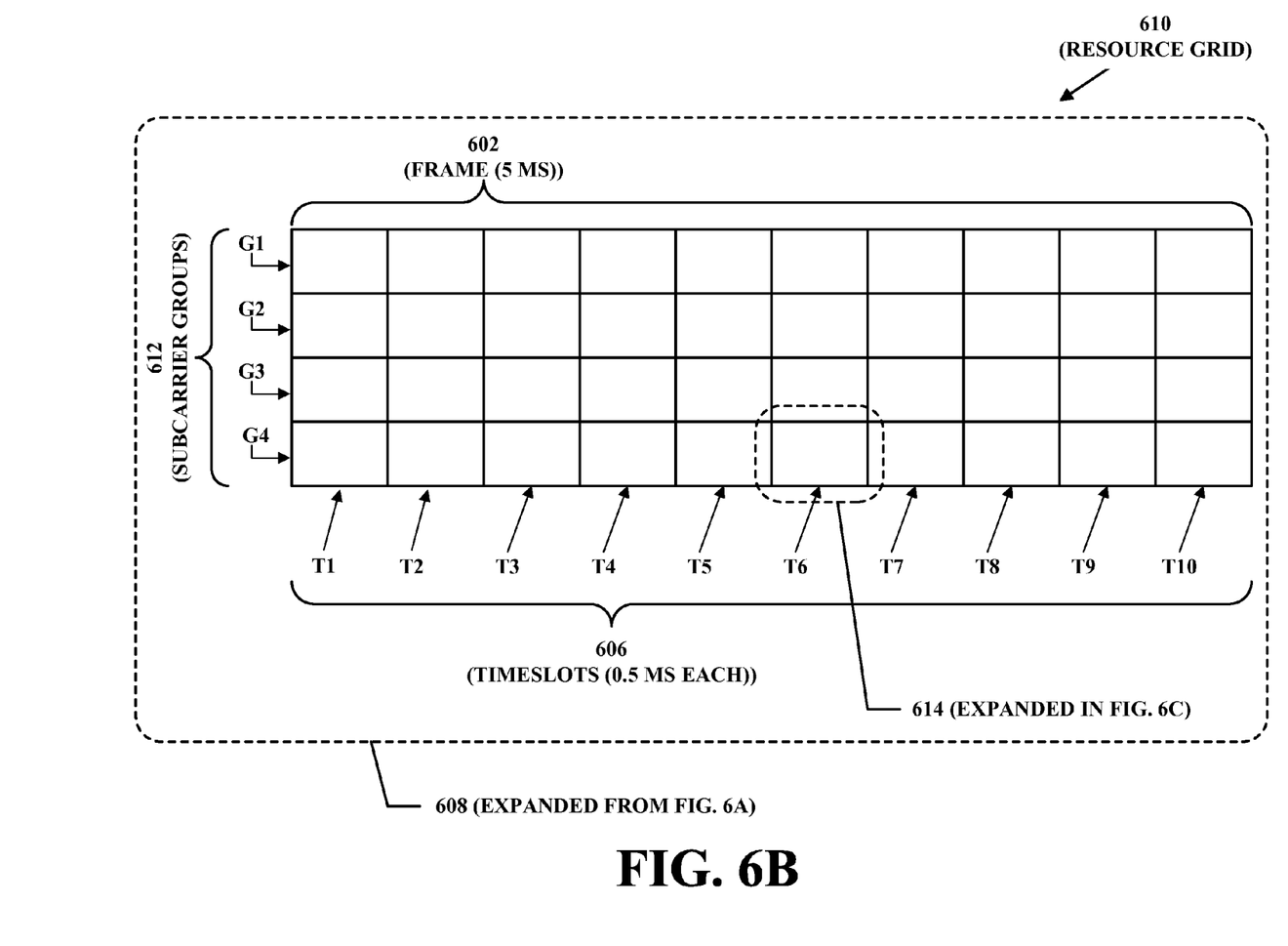
FIG. 6B depicts an example resource grid as an inset of the example resource map of FIG. 6A.

FIG. 6B depicts an example resource grid as an inset of the example resource map of FIG. 6A. In particular, as shown at 608 on both FIGS. 6A and 6B, the fourth row of resource map 600 corresponds to the entirety of resource grid 610. As described above, each channel may be divided into some number (e.g., 4) of non-overlapping subcarrier groupings. A resource grid is a two-dimensional conceptual representation of a logical mapping of the subcarrier groupings within a given channel against the timeslots within a given transmission frame. Thus, each cell in a resource grid represents one subcarrier grouping during one timeslot, and each such cell is also known as a resource block In FIG. 6B, the resource grid 610 maps four example subcarrier groups 612 (labeled G1-G4) against the same ten timeslots 606 (labeled T1-T10) that are depicted in FIG. 6A. Thus, each cell in FIG. 6B represents one of the (example) four available subcarrier groupings in the example channel (CH4) during one of the ten available timeslots in frame 602. As shown at 614, the cell (resource block) corresponding to subcarrier grouping G4 during timeslot T6 is expanded in FIG. 6C.

3. Example Resource Block

Figure 6C:
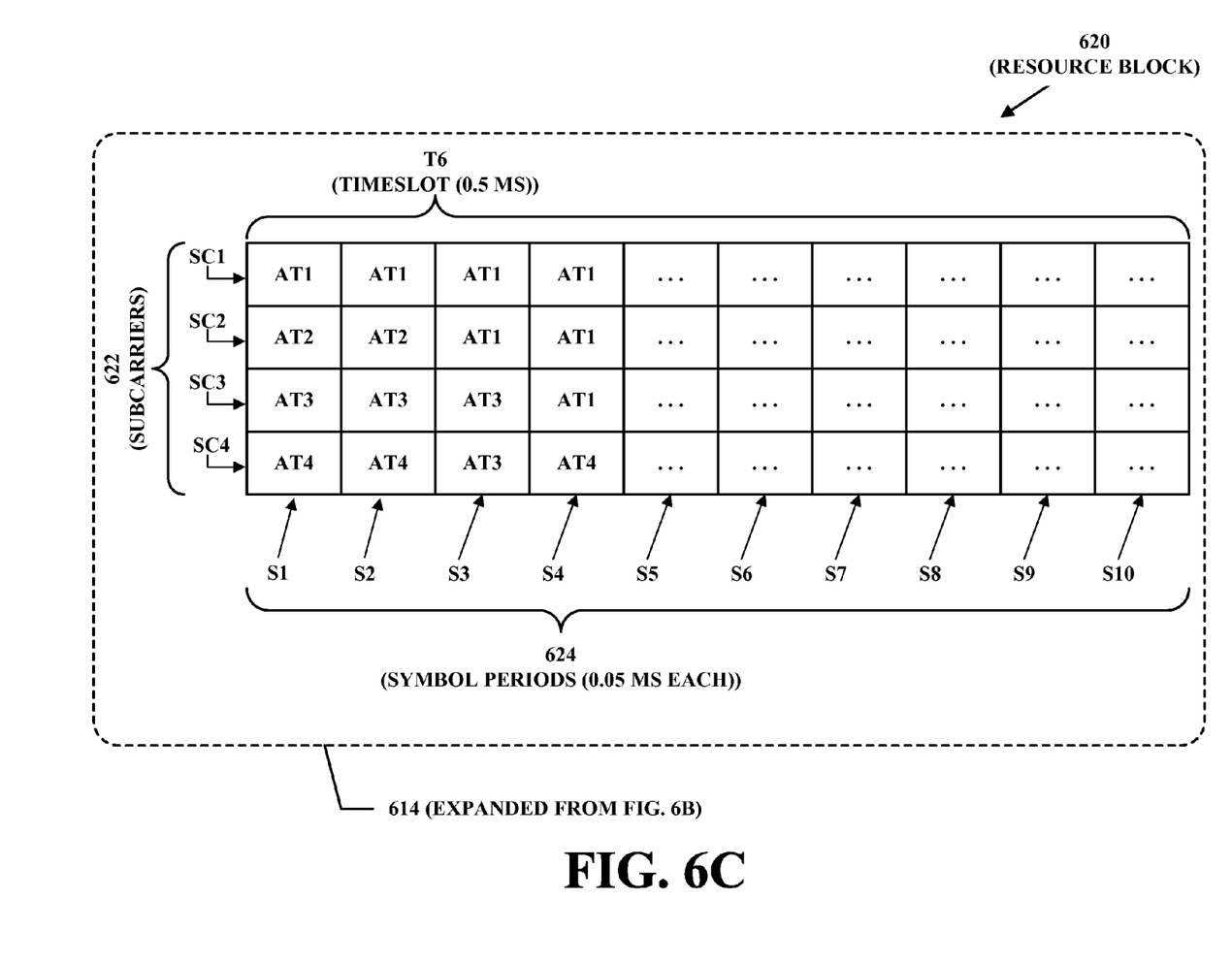
FIG. 6C depicts an example resource block as an inset of the example resource grid of FIG. 6B.

FIG. 6C depicts an example resource block as an inset of the example resource grid of FIG. 6B. In particular, as shown at 614 on both FIGS. 6B and 6C, the sixth cell from the left in the fourth row of resource grid 610 corresponds to the entirety of resource block 620. Each subcarrier grouping into which a given channel has been divided may contain the same number (e.g., 4) (or perhaps different numbers) of subcarriers. The RAN may select and/or vary the number of subcarriers per group during operation, perhaps based on air-interface conditions, number of users in a coverage area, and/or one or more other considerations.

In the context of a given resource block, the time making up the corresponding timeslot (T6, in this example) may be subdivided into some number of (typically equal-duration) time periods known as and referred to herein as symbol periods, labeled in FIG. 6C as S1-S10. Building on the above-described examples of frames each having a duration of 5 ms divided into 10 timeslots each having a duration of 0.5 ms, the example resource block 620 is depicted in FIG. 6C as being divided into ten equal-length symbol periods 624 each having a duration of 0.05 ms, as shown. It is noted that these numbers are used by way of example and for relative ease of explanation, and that other numbers of symbol periods per timeslot can certainly be used in various contexts, with six or seven symbols per timeslot being two relatively commonly implemented examples, though of course other suitable divisions could be used as well.

As depicted in FIG. 6C, a resource block can be conceptually represented as a two-dimensional mapping of the individual subcarriers within the corresponding subcarrier grouping against the symbol periods within the corresponding timeslot. In FIG. 6C, the resource block 620 maps four example subcarriers 622 (labeled SC1-SC4) against the above-described ten symbol periods 624 (labeled S1-S10). Thus, each cell in FIG. 6C represents one of the (example) four available subcarriers in the example subcarrier grouping (G4) during one of the ten available symbol periods in the timeslot T6.

As described, each cell in the resource block that is depicted in FIG. 6C corresponds to a given subcarrier during a given symbol period, and each such cell is also known as a resource element. Each resource element, then, corresponds to a capacity of the RAN to transmit one symbol on one particular subcarrier during one particular symbol period, where the particular subcarrier is in a subcarrier grouping that is part of a channel that is in a particular frequency band on which the RAN provides service in a particular coverage area.

This organization by resource elements, then, makes individual subcarriers assignable to access terminals on a symbol-period-by-symbol-period basis (as shown abstractly by way of example in FIG. 6C with access-terminal indicators AT1-AT4). Thus, when the phrasing is used in this disclosure that a given resource block is assigned to a given access terminal, this should be interpreted broadly as covering at least both of the following: (i) the entire given resource block being assigned to the given access terminal and (ii) at least one resource element in the given resource block being assigned to the given access terminal.

Moreover, and as depicted in FIG. 6C, a given access terminal can be assigned multiple resource elements across subcarrier and/or symbol-period boundaries. That is, a given access terminal can be assigned multiple subcarriers for a given symbol period, and any one or more subcarriers can remain assigned to the same access terminal for multiple consecutive symbol periods. The assignment of any subcarrier can change at any symbol-period transition, which may or may not also be a timeslot transition. In light of the ability of an OFDMA (e.g., LTE) RAN to provide this highly flexible data service on multiple frequency bands in each of numerous coverage areas, it can be appreciated that these types of RANs are capable of simultaneously communicating at comparatively high data rates with numerous access terminals.

III. Example Operation

Figure 7:
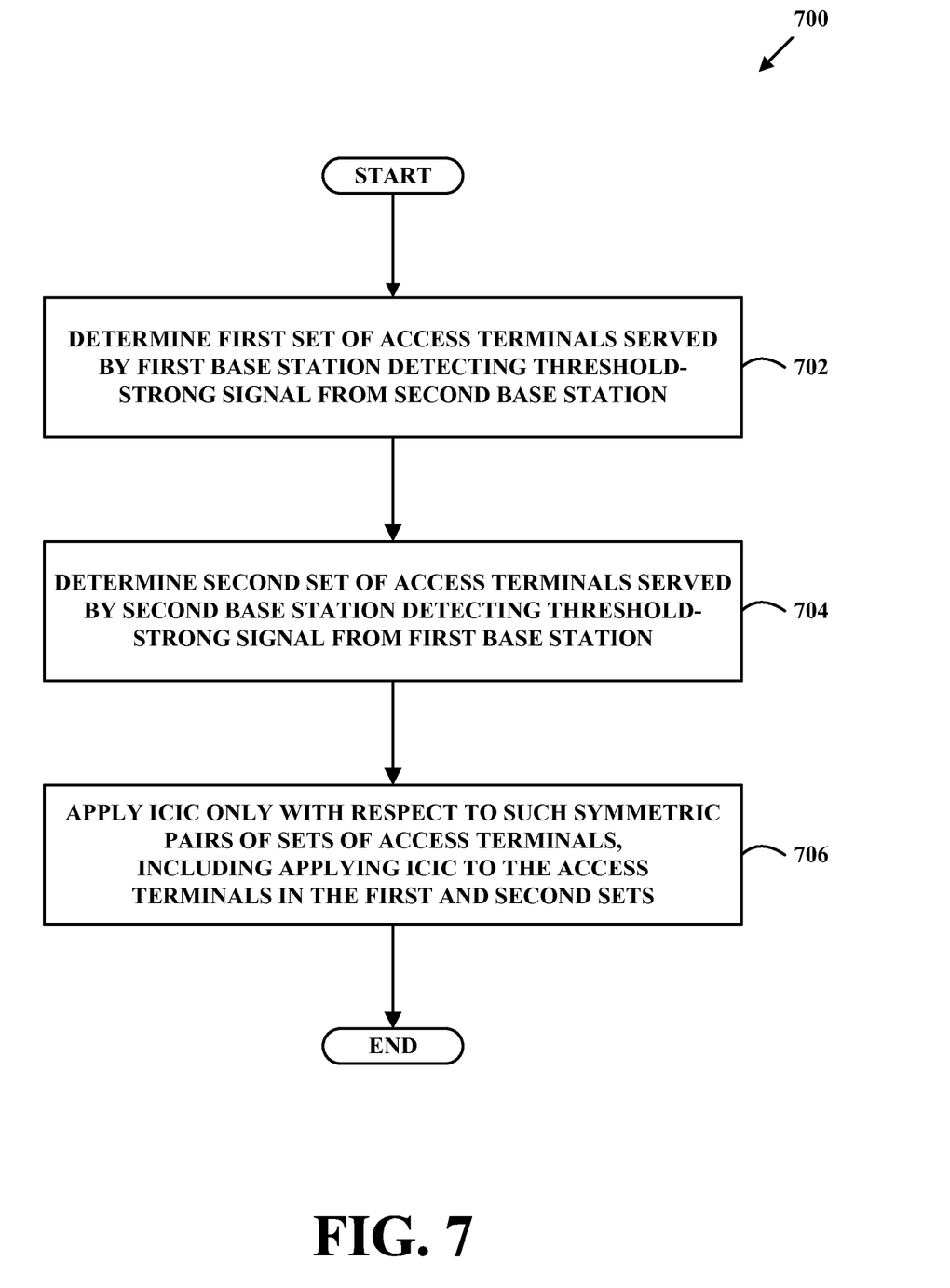
FIG. 7 depicts functions carried out in accordance with at least one embodiment.

FIG. 7 is a flowchart that depicts functions carried out in accordance with at least one embodiment. More particularly, FIG. 7 depicts a method 700 carried out by at least one network entity in the context of a communication system that includes a RAN providing wireless service to access terminals. In this example, the RAN includes a first base station providing the wireless service to a first set of one or more access terminals, and also includes a second base station providing the wireless service to a second set of one or more access terminals. In at least one embodiment, the wireless service comprises LTE service. In at least one embodiment, the first and second base stations comprise first and second eNodeBs, respectively.

Method 700 begins at step 702 with making a first determination, where making the first determination involves making a determination that each access terminal in the first set is receiving at least a threshold-strong signal from the second base station. In at least one embodiment, making the determination that each access terminal in the first set is receiving at least a threshold-strong signal from the second base station involves making a determination that each access terminal in the first set is reporting (e.g., to the first base station) receiving at least a threshold-strong signal from the second base station.

Method 700 continues at step 704 with making a second determination, where making the second determination involves making a determination that each access terminal in the second set is receiving at least a threshold-strong signal from the first base station. In at least one embodiment, making the determination that each access terminal in the second set is receiving at least a threshold-strong signal from the first base station involves making a determination that each access terminal in the second set is reporting (e.g., to the second base station) receiving at least a threshold-strong signal from the first base station.

In connection with both step 702 and step 704, any suitable signal-strength threshold may be used, as different thresholds will likely be appropriate and most helpful in different situations. Furthermore, while it is likely that the same signal-strength threshold would be used in connection with both step 702 and step 704, this is not required.

Moreover, in at least one embodiment, making the first determination further involves making a determination that each access terminal in the first set is receiving no more than a threshold-weak signal from the first base station. And in at least one such embodiment, making the second determination further involves making a determination that each access terminal in the second set is receiving no more than a threshold-weak signal from the second base station. Again, any suitable thresholds could be used for such determinations, and these thresholds would likely but would not necessarily be equal to each other.

Method 700 continues at step 706 with, responsive to making the first and second determinations in combination, managing an assignment of reverse-link resource blocks in the RAN such that no reverse-link resource blocks are assigned to both an access terminal in the first set and an access terminal in the second set. In at least one embodiment, step 706 involves one of the two base stations (e.g., the first base station) wirelessly transmitting information to the other of the two base stations (e.g., the second base station) to enable the second base station to avoid duplicative assignment of any reverse-link resource blocks. This management of the assignment of reverse-link resource blocks could be carried out by one of the base stations, by both base stations in cooperation, by another network entity such as a network server, a BSC, an MSC, or the like, and/or any other suitable device, server, entity, or combination thereof IV. Conclusion While some example embodiments have been described above, those of ordinary skill in the art will appreciate that numerous changes to the described embodiments could be made without departing from the scope and spirit of the claims.

What is claimed is:

1. In a communication system comprising a radio access network (RAN) providing wireless service to access terminals, the RAN comprising a first base station providing the wireless service to a first set of one or more access terminals, the RAN further comprising a second base station providing the wireless service to a second set of one or more access terminals, a method carried out by at least one network entity, the method comprising:

making a first determination, wherein making the first determination comprises making a determination, based on signal-strength reporting from each access terminal in the first set, that each access terminal in the first set is receiving at least a threshold-strong signal from the second base station;

making a second determination, wherein making the second determination comprises making a determination, based on signal-strength reporting from each access terminal in the second set, that each access terminal in the second set is receiving at least a threshold-strong signal from the first base station; and responsive to making the first and second determinations in combination, managing an assignment of reverse-link resource blocks in the RAN such that no reverse-link resource blocks are assigned to both an access terminal in the first set and an access terminal in the second set, wherein managing assignment of reverse-link resource blocks in the RAN such that no reverse-link resource blocks are assigned to an access terminal in the first set and an access terminal in the second set comprises the first base station sending information to the second base station to enable the second base station to avoid assigning to the access terminal in the second set a reverse-link resource block that the first base station assigns to the access terminal in the first set, whereby managing the assignment of the reverse-link resource blocks in response to both the first and second determinations rather than in response to just the first determination helps avoid an over-inclusive limitation on air interface resources of the second base station.

2. The method of claim 1, wherein the wireless service comprises Long Term Evolution (LTE) wireless service.

3. The method of claim 1, wherein the first and second base stations comprise first and second eNodeBs, respectively.

4. The method of claim 1, wherein making the determination that each access terminal in the first set is receiving at least a threshold-strong signal from the second base station comprises making a determination that each access terminal in the first set is reporting receiving at least a threshold-strong signal from the second base station.

5. The method of claim 4, wherein reporting comprises reporting to the first base station.

6. The method of claim 1, wherein making the determination that each access terminal in the second set is receiving at least a threshold-strong signal from the first base station comprises making a determination that each access terminal in the second set is reporting receiving at least a threshold-strong signal from the first base station.

7. The method of claim 6, wherein reporting comprises reporting to the second base station.

8. The method of claim 1, wherein making the first determination further comprises making a determination that each access terminal in the first set is receiving no more than a threshold-weak signal from the first base station.

9. The method of claim 8, wherein making the second determination further comprises making a determination that each access terminal in the second set is receiving no more than a threshold-weak signal from the second base station.

10. In a communication system comprising a radio access network (RAN) providing wireless service to access terminals, the RAN comprising a first base station providing the wireless service to a first set of one or more access terminals, the RAN further comprising a second base station providing the wireless service to a second set of one or more access terminals, at least one network entity comprising:

a communication interface;

a processor; and data storage containing instructions executable by the processor for carrying out a set of functions, the set of functions including:

making a first determination, wherein making the first determination comprises making a determination, based on signal-strength reporting from each access terminal in the first set, that each access terminal in the first set is receiving at least a threshold-strong signal from the second base station;

making a second determination, wherein making the second determination comprises making a determination, based on signal-strength reporting from each access terminal in the second set, that each access terminal in the second set is receiving at least a threshold-strong signal from the first base station; and responsive to making both the first and second determinations in combination, managing an assignment of reverse-link resource blocks in the RAN such that no reverse-link resource blocks are assigned to both an access terminal in the first set and an access terminal in the second set, wherein managing assignment of reverse-link resource blocks in the RAN such that no reverse-link resource blocks are assigned to an access terminal in the first set and an access terminal in the second set comprises the first base station sending information to the second base station to enable the second base station to avoid assigning to the access terminal in the second set a reverse-link resource block that the first base station assigns to the access terminal in the first set, whereby managing the assignment of the reverse-link resource blocks in response to both the first and second determinations rather than in response to just the first determination helps avoid an over-inclusive limitation on air interface resources of the second base station.

11. The at least one network entity of claim 10, wherein the wireless service comprises Long Term Evolution (LTE) wireless service.

12. The at least one network entity of claim 10, wherein the first and second base stations comprise first and second eNodeBs, respectively.

13. The at least one network entity of claim 10, wherein making the determination that each access terminal in the first set is receiving at least a threshold- strong signal from the second base station comprises making a determination that each access terminal in the first set is reporting receiving at least a threshold-strong signal from the second base station.

14. The at least one network entity of claim 13, wherein reporting comprises reporting to the first base station.

15. The at least one network entity of claim 10, wherein making the determination that each access terminal in the second set is receiving at least a threshold-strong signal from the first base station comprises making a determination that each access terminal in the second set is reporting receiving at least a threshold-strong signal from the first base station.

16. The at least one network entity of claim 15, wherein reporting comprises reporting to the second base station.

17. The at least one network entity of claim 10, wherein making the first determination further comprises making a determination that each access terminal in the first set is receiving no more than a threshold-weak signal from the first base station.

18. The at least one network entity of claim 17, wherein making the second determination further comprises making a determination that each access terminal in the second set is receiving no more than a threshold-weak signal from the second base station.

* * * * *